United States Patent [19]

Abernethy

[11] Patent Number: 5,347,607
[45] Date of Patent: Sep. 13, 1994

[54] OPTICAL CABLE HAVING PRESTRIPPED TERMINAL ELEMENTS

[75] Inventor: J. David Abernethy, Hickory, N.C.

[73] Assignee: Siecor Corporation, Hickory, N.C.

[21] Appl. No.: 941,292

[22] Filed: Sep. 4, 1992

[51] Int. Cl.$^5$ ................................................ G02B 6/44
[52] U.S. Cl. ...................................... 385/102; 385/75;
     385/100; 385/147
[58] Field of Search .................... 385/75, 92, 100, 102,
     385/73, 147, 117, 116, 107, 135, 87; 174/70 S;
     29/867, 858, 564.4; 264/1.5

[56] References Cited

U.S. PATENT DOCUMENTS

| | | | |
|---|---|---|---|
| 3,999,289 | 12/1976 | Büttner et al. | 29/858 |
| 4,030,174 | 6/1977 | Büttner et al. | 29/564.4 |
| 4,330,171 | 5/1982 | Malsot et al. | 385/80 |
| 4,367,917 | 1/1983 | Gray | 385/102 |
| 4,460,159 | 7/1984 | Charlebois et al. | 385/100 |
| 4,660,925 | 4/1987 | McCaughan, Jr. | 385/76 |
| 4,712,861 | 12/1987 | Lukas et al. | 385/75 |
| 5,013,495 | 5/1991 | Noba et al. | 264/1.5 |
| 5,039,196 | 8/1991 | Nilsson | 385/100 |
| 5,073,044 | 12/1991 | Egner et al. | 358/100 |

*Primary Examiner*—Frank Gonzalez
*Attorney, Agent, or Firm*—Roy B. Moffitt

[57] ABSTRACT

Disclosed is a light waveguide having one end over which the fiber coating is removed, the prestripped light waveguide contained in an optical transmission cable.

3 Claims, 1 Drawing Sheet

OPTICAL CABLE HAVING PRESTRIPPED TERMINAL ELEMENTS

BACKGROUND OF THE INVENTION

The field of the invention is optical transmission cables.

A light waveguide, consisting of a core and a cladding, normally has a coating applied thereover prior to cabling. The purpose of the overcoat is to provide additional structural and environmental protection to the light waveguide core and cladding. There are several standard light waveguide coating thicknesses.

It is usually necessary to remove a portion of the coating from one end of the light waveguide prior to splicing or connectorizing the optical fiber. In practice, a craftsman must enter the cable end and use a stripping tool to remove the light waveguide coating. A cleaning agent is normally applied to the light waveguide as well. The stripping operation is sometimes unsuccessful, and broken light waveguides can result.

To avoid the problems associated with field optical fiber stripping, some light waveguide cables are now provided as preassembled; that is, the cable as shipped by the manufacturer contains light waveguides which already have connectors properly connected to one end of the light waveguides. This option, however, requires that the particular types of fiber optic connectors to be attached be specified by the customer, and precautions must be taken against damage to the cable assemblies during shipment.

SUMMARY OF THE INVENTION

The optical transmission cable according to the present invention has at least one light waveguide with a prestripped coating. The light waveguide has the normal coating thereon throughout its length except for an uncoated terminal free end. An outer jacket covers both the uncoated and coated portions of the light waveguide. The words "terminal free end" in the claims means a free end which has no attachments, such as connectors, thereto.

BRIEF DESCRIPTION OF THE DRAWINGS

The detailed description of the preferred embodiments is made with reference to the drawings, in which.

DETAILED DESCRIPTION OF THE PREFERRED EMBODIMENTS

Figure 1:
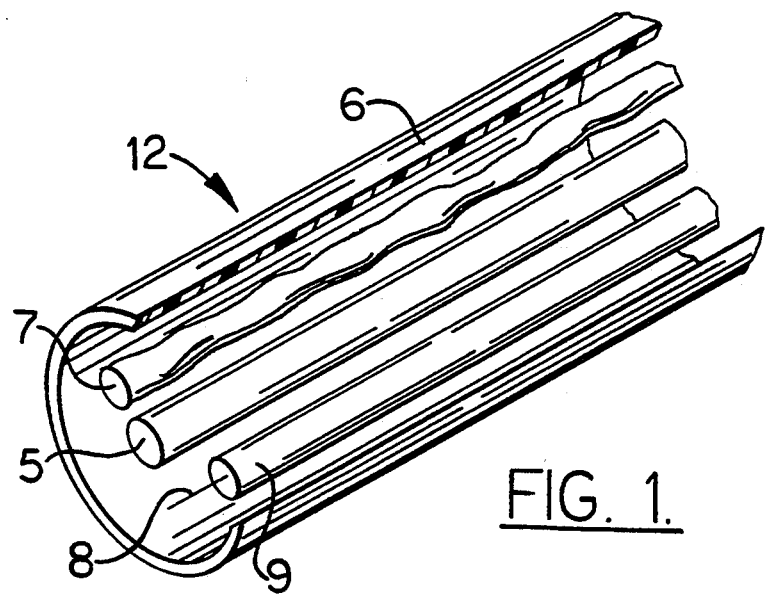
FIG. 1 is a perspective cut away view of the cable according to the invention.
Figure 2:
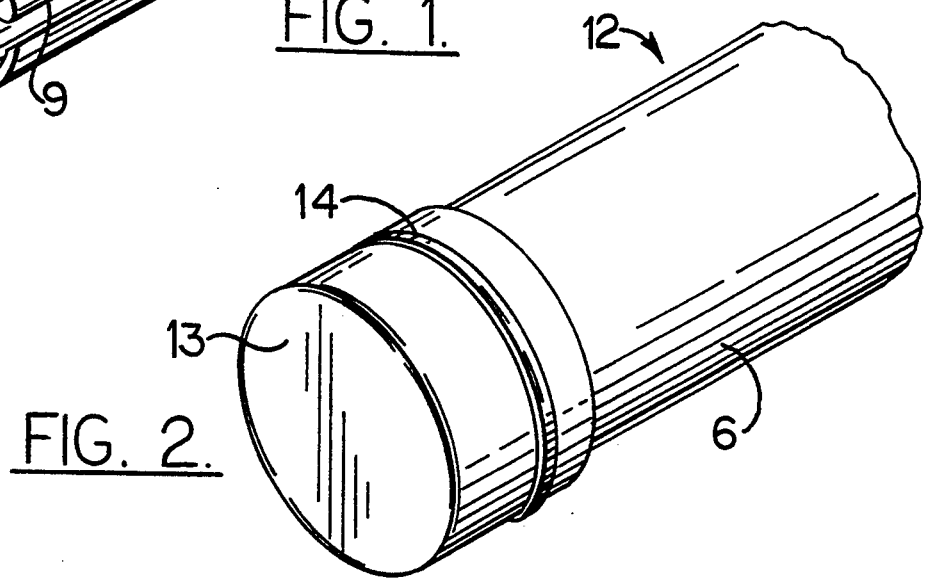
FIG. 2 is a perspective view of the cable according to the present invention having an end cap placed thereover; and, FIG. 3 is a side view of the cable according to the invention with the end cap removed.
Figure 3:
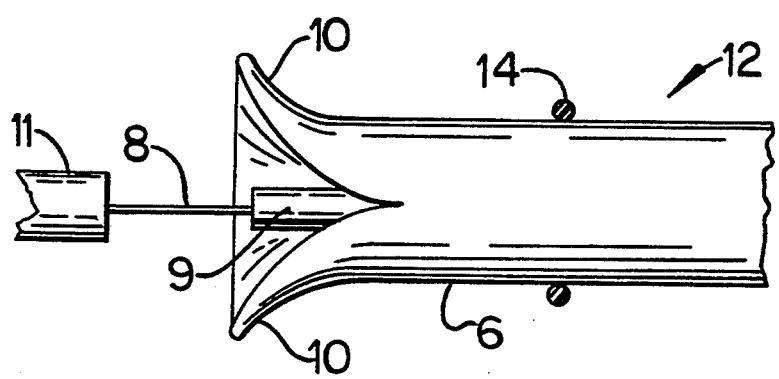

Shown in FIG. 1 is a plastic tube 6 partially cut away to reveal an antibuckling member 5, a tensile member 7, which may be an aramid fiber, and a light waveguide having a coating 9 throughout its entire length except for an uncoated terminal free end 8, which has no attachments, such as connectors, thereto.

Because light waveguide terminal free end 8 lacks the protection of coating 9, it may be desirable to use an end cap 13 covering the end of tube 6 which extends over uncoated light portion 8. Therefore, placed over cable 12 is an end cap 13 secured by a resilient band 14.

After cable 12 has been received by the customer, the customer may remove end cap 13 and attach any of a wide variety of connectors such as connector 11 to optical fiber terminal free end 8.

The cable according to the invention may be manufactured in at least two ways. One way is to extrude tube 6 over a coated light waveguide according to the prior practice, make a slit in tube 6 to create tube flaps 10, remove a portion of coating 9 with a coating stripping tool to uncover terminal free end 8, folding tube flaps 10 back around light waveguide 8, and then placing end cap 13 thereover. An alternative method is to strip the portion of coating 9 from terminal free end 8 prior to cabling and thereafter extruding plastic tube 6 over both the stripped and unstripped ends of the light waveguide. If the latter procedure is followed, it is desirable to provide an intermediate layer of material such as aramid fiber 7 to shield terminal free end 8 from heat produced during the extrusion process.

What is claimed is:

1. An optical transmission cable having at least one light waveguide with a prestripped coating, comprising:
    (a) a light waveguide which has a coating thereon throughout its length except for an uncoated terminal free end having no attachments thereto;
    (b) an outer jacket covering both the coated and uncoated portions of said light waveguide; and,
    (c) a cap covering the cable and at which the uncoated light waveguide is located.

2. A method for making a prestripped optical cable, comprising stripping the coating from one end of a light waveguide, and thereafter extruding a plastic jacket over both the stripped and unstripped ends of the light waveguide.

3. An optical transmission cable having at least one light waveguide with a prestripped coating, comprising:
    (a) a light waveguide which as a coating thereon throughout its length except for an uncoated terminal free end having no attachments thereto; and
    (b) an outer jacket surrounding both the coated and uncoated portions of said light waveguide.

* * * * *